3,134,799
TERTIARY ALKYL ESTERS OF THIOL-
CARBAMIC ACID
Bernard Loev, Broomall, and James W. Wilson, Wayne,
Pa., assignors to Smith Kline & French Laboratories,
Philadelphia, Pa., a corporation of Pennsylvania
No Drawing. Filed Aug. 24, 1961, Ser. No. 133,558
6 Claims. (Cl. 260—455)

This invention relates to novel tertiary alkyl esters of thiolcarbamic acid which have pharmacodynamic activity. In particular the thiolcarbamates of this invention are variously useful as central nervous system depressants, hypnotics, ataractics, muscle relaxants and anticonvulsants.

The novel compounds of this invention are represented by the following general formula:

FORMULA I

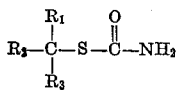

when:

$R_1$ and $R_3$ represent lower alkyl; and $R_2$ represents lower alkyl, vinyl or ethynyl.

The term "lower alkyl" where used herein indicates, preferably, alkyl groups having 1–3 carbon atoms.

Preferred compounds of this invention are those of Formula I in which $R_2$ is lower alkyl; particularly advantageous compounds are t-butyl thiolcarbamate and 1-ethyl-1-methylpropyl thiolcarbamate.

The tertiary alkyl thiolcarbamates of this invention are prepared by reacting a tertiary alkanethiol with an excess of an alkali metal cyanate or an alkali earth metal cyanate, preferably sodium cyanate, and an excess of trifluoroacetic acid. Preferably, the tertiary alkanethiol is reacted with about 2–4 molar equivalents of sodium cyanate and about 2–4 molar equivalents of trifluoroacetic acid.

The reaction is run at temperatures of about 15–50° C. for about 2–24 hours, preferably about 2–4 hours. Usually the reaction is carried out at room temperature for about two hours. Conveniently an organic solvent, which is inert to the alkali metal or alkali earth metal cyanate, is employed. Exemplary of suitable solvents are ethers such as diethyl ether, diisopropyl ether or tetrahydrofuran; hydrocarbons such as benzene or toluene; or halogenated hydrocarbons such as chloroform, methylene chloride or carbon tetrachloride. The yield of thiolcarbamate is increased by the presence of a small amount of water in the reaction mixture.

Other methods may also be used such as the reaction of the thiol with phosgene followed by treatment with ammonia or heating the thiol with urethane.

The following examples are not limiting but are illustrative of the compounds in accordance with this invention and of the procedures for their preparation and will serve to make fully apparent all of the compounds embraced by the general formula given hereabove.

Example 1

To 9.0 g. of t-butanethiol and 13.0 g. of sodium cyanate in ether is added 22.8 g. of trifluoroacetic acid. When the initial exothermic reaction subsides, the mixture is warmed to 45° C. and stirred for four hours. The resulting suspension is washed with a small amount of water, dried and the organic layer is concentrated. Addition of water, filtration of the resulting white solid and recrystallization from petroleum ether gives t-butyl thiolcarbamate, M.P. 92–5° C.

Example 2

A suspension of 9.0 g. of 3-methyl-3-pentanethiol and 9.9 g. of sodium cyanate in methylene chloride is treated with 17.4 g. of trifluoroacetic acid. The resulting mixture is stirred at room temperature for 16 hours, then washed with water, dried and concentrated in vacuo. On cooling a solid product is formed. Filtration and recrystallization from petroleum ether gives 3-methyl-3-pentyl thiolcarbamate, M.P. 45–47° C.

Example 3

A mixture of 6.6 g. of 3-ethyl-3-pentanethiol, 6.5 g. of sodium cyanate, 11.4 g. of trifluoroacetic acid and 75 ml. of benzene is stirred at 45° C. for two hours. The mixture is carefully neutralized with sodium carbonate, then concentrated, treated with water and filtered to give 3-ethyl-3-pentyl thiolcarbamate.

Example 4

To 6.0 g. of 2-methyl-2-pentanethiol and 6.0 g. of sodium cyanate in methylene chloride is added 11.4 g. of trifluoroacetic acid. The mixture is stirred at 40–45° C. for three hours, then concentrated, diluted with water and filtered to give 2-methyl-2-pentyl thiolcarbamate.

Example 5

To 2.6 g. of 2-methyl-2-butanethiol and 4.0 g. of potassium cyanate in 50 ml. of tetrahydrofuran is added 5.7 g. of trifluoroacetic acid. The mixture is stirred for two hours at room temperatures. Neutralizing with sodium bicarbonate, concentrating, adding water and filtering the solid products gives 2-methyl-2-butyl thiolcarbamate.

Example 6

A mixture of 5.0 g. of 3-methyl-3-but-1-ynethiol [prepared by reacting 3-methyl-3-bromobut-1-yne with thiourea to form the S-(3-methyl-3-but-1-ynyl)thiouronium salt and hydrolyzing the thiouronium salt with sodium hydroxide], 6.5 g. of sodium cyanate, 11.4 g. of trifluoroacetic acid and 75 ml. of ether is stirred at reflux temperature for two hours. Working up as in Example 5 gives 3-methyl-3-but-1-ynyl thiolcarbamate.

Example 7

To 5.3 g. of 3-methyl-3-but-1-enethiol [prepared by reacting 3-methyl-3-bromobut-1-ene with thiourea and hydrolyzing the resulting thiouronium salt with sodium hydroxide] and 7.2 g. of sodium cyanate in benzene is added 5.9 g. of trifluoroacetic acid. After three hours at 40° C. the mixture is concentrated, diluted with water and filtered to give 3-methyl-3-but-1-enyl thiolcarbamate.

What is claimed is:

1. A chemical compound having the following structural formula:

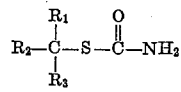

in which $R_1$ and $R_3$ are lower alkyl and $R_2$ is a member selected from the group consisting of lower alkyl, vinyl and ethynyl, each of said lower alkyl moieties having 1 to 3 carbon atoms.

2. A chemical compound having the following structural formula:

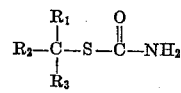

in which $R_1$, $R_2$ and $R_3$ are lower alkyl having 1 to 3 carbon atoms.

3. A chemical compound having the following structural formula:

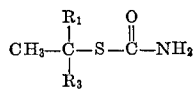

in which $R_1$ and $R_3$ are lower alkyl having 1 to 3 carbon atoms.

4. A chemical compound having the following structural formula:

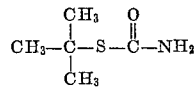

5. A chemical compound having the following structural formula:

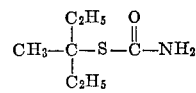

6. A chemical compound having the following structural formula:

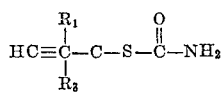

in which $R_1$ and $R_3$ are lower alkyl having 1 to 3 carbon atoms.

References Cited in the file of this patent

UNITED STATES PATENTS

| | | |
|---|---|---|
| 2,941,880 | D'Amico | June 21, 1960 |
| 2,983,747 | Campbell et al. | May 9, 1961 |
| 2,992,091 | Harman et al. | July 11, 1961 |

OTHER REFERENCES

Choppin et al.: Jour. Am. Chem. Soc., vol. 70, pp. 2967 (1948).

Wagner and Zook: "Synthetic Organic Chemistry," p. 827 (1953).

Riemschneider: Jour. Am. Chem. Soc., vol. 78, pp. 844–845 (1956).

Noller: "Chemistry of Organic Compounds," 2d ed. pp. 272 (1957).